(12) United States Patent
Kakhandiki

(10) Patent No.: US 11,954,008 B2
(45) Date of Patent: *Apr. 9, 2024

(54) USER ACTION GENERATED PROCESS DISCOVERY

(71) Applicant: Automation Anywhere, Inc., San Jose, CA (US)

(72) Inventor: Abhijit Kakhandiki, San Jose, CA (US)

(73) Assignee: Automation Anywhere, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/967,011

(22) Filed: Oct. 17, 2022

(65) Prior Publication Data

US 2023/0072084 A1   Mar. 9, 2023

Related U.S. Application Data

(63) Continuation of application No. 16/724,308, filed on Dec. 22, 2019, now Pat. No. 11,481,304.

(51) Int. Cl.
*G06F 11/34* (2006.01)
*G06F 9/30* (2018.01)
(Continued)

(52) U.S. Cl.
CPC ...... *G06F 11/3438* (2013.01); *G06F 9/30145* (2013.01); *G06F 9/3836* (2013.01);
(Continued)

(58) Field of Classification Search
CPC ...... G06N 3/08; G06N 20/00; G06F 11/3438; G06F 9/4843; G06F 9/542; G06F 9/30145; G06F 9/3836
See application file for complete search history.

(56) References Cited

U.S. PATENT DOCUMENTS 5,949,999 A    9/1999  Song et al.
5,983,001 A    11/1999 Boughner et al.
(Continued)

FOREIGN PATENT DOCUMENTS

WO   2019/092672 A2   5/2019
WO   2022/076488      4/2022

OTHER PUBLICATIONS

Al Sallami, Load Balancing in Green Cloud Computation, Proceedings of the World Congress on Engineering 2013 vol. II, WCE 2013, 2013, pp. 1-5 (Year: 2013).

(Continued)

*Primary Examiner* — Zachary K Huson

(57) ABSTRACT

Task automation is enabled by recording, over a period of time, inputs of a computing device user to generate a log of inputs by the user in connection with one or more task applications. The user inputs are stored along with information pertaining to the one or more task applications. The log is processed to identify the one or more task applications to generate a user task file. The log is further processed to identify the fields in the task applications with which the user entered inputs and the identified fields are stored to the task file. The task file is processed to identify one or more tasks performed by the user. An automated software robot which is encoded with instructions to perform automatically, when invoked, one or more of the tasks performed by the user may be automatically generated.

25 Claims, 10 Drawing Sheets

(51) Int. Cl.
  *G06F 9/38* (2018.01)
  *G06F 9/48* (2006.01)
  *G06F 9/54* (2006.01)
  *G06N 3/08* (2023.01)
  *G06N 20/00* (2019.01)

(52) U.S. Cl.
  CPC ............ *G06F 9/4843* (2013.01); *G06F 9/542* (2013.01); *G06N 3/08* (2013.01); *G06N 20/00* (2019.01)

(56) References Cited

U.S. PATENT DOCUMENTS

| | | |
|---|---|---|
| 6,133,917 A | 10/2000 | Feigner et al. |
| 6,226,407 B1 | 5/2001 | Zabih et al. |
| 6,389,592 B1 | 5/2002 | Ayres et al. |
| 6,427,234 B1 | 5/2002 | Chambers et al. |
| 6,473,794 B1 | 10/2002 | Guheen et al. |
| 6,496,979 B1 | 12/2002 | Chen et al. |
| 6,640,244 B1 | 10/2003 | Bowman-Amuah |
| 6,704,873 B1 | 3/2004 | Underwood |
| 6,898,764 B2 | 5/2005 | Kemp |
| 6,954,747 B1 | 10/2005 | Wang et al. |
| 6,957,186 B1 | 10/2005 | Guheen et al. |
| 7,091,898 B2 | 8/2006 | Arling et al. |
| 7,246,128 B2 | 7/2007 | Jordahl |
| 7,398,469 B2 | 7/2008 | Kisamore et al. |
| 7,441,007 B1 | 10/2008 | Kirkpatrick et al. |
| 7,533,096 B2 | 5/2009 | Rice et al. |
| 7,568,109 B2 | 7/2009 | Powell et al. |
| 7,571,427 B2 | 8/2009 | Wang et al. |
| 7,765,525 B1 | 7/2010 | Davidson et al. |
| 7,783,135 B2 | 8/2010 | Gokturk |
| 7,805,317 B2 | 9/2010 | Khan et al. |
| 7,805,710 B2 | 9/2010 | North |
| 7,810,070 B2 | 10/2010 | Nasuti et al. |
| 7,846,023 B2 | 12/2010 | Evans et al. |
| 8,028,269 B2 | 9/2011 | Bhatia et al. |
| 8,056,092 B2 | 11/2011 | Allen et al. |
| 8,095,910 B2 | 1/2012 | Nathan et al. |
| 8,132,156 B2 | 3/2012 | Malcolm |
| 8,209,738 B2 | 6/2012 | Nicol et al. |
| 8,234,622 B2 | 7/2012 | Meijer et al. |
| 8,245,215 B2 | 8/2012 | Extra |
| 8,352,464 B2 | 1/2013 | Folev |
| 8,365,147 B2 | 1/2013 | Grechanik |
| 8,396,890 B2 | 3/2013 | Lim |
| 8,438,558 B1 | 5/2013 | Adams |
| 8,443,291 B2 | 5/2013 | Ku et al. |
| 8,464,240 B2 | 6/2013 | Fritsch et al. |
| 8,498,473 B2 | 7/2013 | Chong et al. |
| 8,504,803 B2 | 8/2013 | Shukla |
| 8,631,458 B1 | 1/2014 | Banerjee |
| 8,682,083 B2 | 3/2014 | Kumar et al. |
| 8,713,003 B2 | 4/2014 | Fotev |
| 8,724,907 B1 | 5/2014 | Sampson et al. |
| 8,769,482 B2 | 7/2014 | Batey et al. |
| 8,819,241 B1 | 8/2014 | Washburn |
| 8,832,048 B2 | 9/2014 | Lim |
| 8,874,685 B1 | 10/2014 | Hollis et al. |
| 8,943,493 B2 | 1/2015 | Schneider |
| 8,965,905 B2 | 2/2015 | Ashmore et al. |
| 8,966,458 B2 | 2/2015 | Asai |
| 9,032,314 B2 | 5/2015 | Mital et al. |
| 9,104,294 B2 | 8/2015 | Forstall et al. |
| 9,171,359 B1 | 10/2015 | Lund |
| 9,213,625 B1 | 12/2015 | Schrage |
| 9,251,413 B2 | 2/2016 | Meler |
| 9,278,284 B2 | 3/2016 | Ruppert et al. |
| 9,444,844 B2 | 9/2016 | Edery et al. |
| 9,462,042 B2 | 10/2016 | Shukla et al. |
| 9,571,332 B2 | 2/2017 | Subramaniam |
| 9,600,519 B2 | 3/2017 | Schoning et al. |
| 9,621,584 B1 | 4/2017 | Schmidt et al. |
| 9,934,129 B1 | 4/2018 | Budurean |
| 9,946,233 B2 | 4/2018 | Brun et al. |
| 9,965,139 B2 | 5/2018 | Nychis |
| 9,990,347 B2 | 6/2018 | Raskovic et al. |
| 10,015,503 B1 | 7/2018 | Ahammad |
| 10,043,255 B1 | 8/2018 | Pathapati et al. |
| 10,282,280 B1 | 5/2019 | Gouskova |
| 10,489,682 B1 | 11/2019 | Kumar et al. |
| 10,592,738 B2 | 3/2020 | Northrup |
| 10,654,166 B1 | 5/2020 | Hall |
| 10,706,218 B2 | 7/2020 | Milward et al. |
| 10,706,228 B2 | 7/2020 | Buisson |
| 10,713,068 B1 | 7/2020 | Zohar |
| 10,936,807 B1 | 3/2021 | Walters |
| 11,099,972 B2 | 8/2021 | Puszkiewicz |
| 11,176,443 B1 | 11/2021 | Selva |
| 11,182,178 B1 | 11/2021 | Singh et al. |
| 11,182,604 B1 | 11/2021 | Methaniya |
| 11,243,803 B2 | 2/2022 | Anand et al. |
| 11,263,391 B2 | 3/2022 | Potts |
| 11,348,353 B2 | 5/2022 | Sundell et al. |
| 11,481,304 B1 * | 10/2022 | Kakhandiki ............ G06F 17/40 |
| 11,614,731 B2 | 3/2023 | Anand et al. |
| 11,775,321 B2 | 10/2023 | Singh et al. |
| 11,775,339 B2 | 10/2023 | Anand et al. |
| 11,775,814 B1 | 10/2023 | Anand et al. |
| 11,782,734 B2 | 10/2023 | Ginoya et al. |
| 2002/0029232 A1 | 3/2002 | Bobrow et al. |
| 2003/0033590 A1 | 2/2003 | Leherbauer |
| 2003/0101245 A1 | 5/2003 | Srinivasan et al. |
| 2003/0114959 A1 | 6/2003 | Sakamoto |
| 2003/0159089 A1 | 8/2003 | DiJoseph |
| 2004/0083472 A1 | 4/2004 | Rao et al. |
| 2004/0153649 A1 | 8/2004 | Rhoads |
| 2004/0172526 A1 | 9/2004 | Tann et al. |
| 2004/0210885 A1 | 10/2004 | Wang et al. |
| 2004/0243994 A1 | 12/2004 | Nasu |
| 2005/0188357 A1 | 8/2005 | Derks et al. |
| 2005/0204343 A1 | 9/2005 | Kisamore et al. |
| 2005/0257214 A1 | 11/2005 | Moshir et al. |
| 2006/0095276 A1 | 5/2006 | Axelrod et al. |
| 2006/0150188 A1 | 7/2006 | Roman et al. |
| 2006/0218110 A1 | 9/2006 | Simske et al. |
| 2007/0030528 A1 | 2/2007 | Quaeler et al. |
| 2007/0089101 A1 | 4/2007 | Romanovskiy |
| 2007/0101291 A1 | 5/2007 | Forstall et al. |
| 2007/0112574 A1 | 5/2007 | Greene |
| 2007/0156677 A1 | 7/2007 | Szabo |
| 2007/0233741 A1 | 10/2007 | Shen |
| 2008/0005086 A1 | 1/2008 | Moore |
| 2008/0027769 A1 | 1/2008 | Eder |
| 2008/0028392 A1 | 1/2008 | Chen et al. |
| 2008/0133052 A1 | 6/2008 | Jones |
| 2008/0209392 A1 | 8/2008 | Able et al. |
| 2008/0222454 A1 | 9/2008 | Kelso |
| 2008/0263024 A1 | 10/2008 | Landschaft et al. |
| 2008/0310625 A1 | 12/2008 | Vanstone et al. |
| 2009/0037509 A1 | 2/2009 | Parekh et al. |
| 2009/0103769 A1 | 4/2009 | Milov et al. |
| 2009/0116071 A1 | 5/2009 | Mantell |
| 2009/0172814 A1 | 7/2009 | Khosravi et al. |
| 2009/0199160 A1 | 8/2009 | Vaitheeswaran et al. |
| 2009/0217309 A1 | 8/2009 | Grechanik et al. |
| 2009/0249297 A1 | 10/2009 | Doshi et al. |
| 2009/0313229 A1 | 12/2009 | Fellenstein et al. |
| 2009/0320002 A1 | 12/2009 | Peri-Glass et al. |
| 2010/0023602 A1 | 1/2010 | Marlone |
| 2010/0023933 A1 | 1/2010 | Bryant et al. |
| 2010/0100605 A1 | 4/2010 | Allen et al. |
| 2010/0106671 A1 | 4/2010 | Li et al. |
| 2010/0138015 A1 | 6/2010 | Colombo et al. |
| 2010/0235433 A1 | 9/2010 | Ansari et al. |
| 2010/0251163 A1 | 9/2010 | Keable |
| 2011/0022578 A1 | 1/2011 | Folev |
| 2011/0106284 A1 | 5/2011 | Catoen |
| 2011/0145807 A1 | 6/2011 | Molinie et al. |
| 2011/0197121 A1 | 8/2011 | Kletter |
| 2011/0267490 A1 | 11/2011 | Goktekin |
| 2011/0276568 A1 | 11/2011 | Fotev |
| 2011/0276946 A1 | 11/2011 | Pletter |

(56) References Cited

U.S. PATENT DOCUMENTS

| | | |
|---|---|---|
| 2011/0302570 A1 | 12/2011 | Kurimilla et al. |
| 2012/0011458 A1 | 1/2012 | Xia et al. |
| 2012/0042281 A1 | 2/2012 | Green |
| 2012/0124062 A1 | 5/2012 | Macbeth et al. |
| 2012/0131456 A1 | 5/2012 | Lin et al. |
| 2012/0143941 A1 | 6/2012 | Kim |
| 2012/0266149 A1 | 10/2012 | Lebert |
| 2012/0324333 A1 | 12/2012 | Lehavi |
| 2012/0330940 A1 | 12/2012 | Caire et al. |
| 2013/0145006 A1 | 6/2013 | Tammam |
| 2013/0173648 A1 | 7/2013 | Tan et al. |
| 2013/0227535 A1 | 8/2013 | Kannan |
| 2013/0236111 A1 | 9/2013 | Pintsov |
| 2013/0290318 A1 | 10/2013 | Shapira et al. |
| 2014/0036290 A1 | 2/2014 | Miyagawa |
| 2014/0045484 A1 | 2/2014 | Kim et al. |
| 2014/0075371 A1 | 3/2014 | Carmi |
| 2014/0181705 A1 | 6/2014 | Hey et al. |
| 2014/0189576 A1 | 7/2014 | Carmi |
| 2014/0379666 A1 | 12/2014 | Bryon |
| 2015/0082280 A1 | 3/2015 | Betak et al. |
| 2015/0235193 A1 | 8/2015 | Cummings |
| 2015/0310268 A1 | 10/2015 | He |
| 2015/0347284 A1 | 12/2015 | Hey et al. |
| 2016/0019049 A1 | 1/2016 | Kakhandiki et al. |
| 2016/0034441 A1 | 2/2016 | Nguyen et al. |
| 2016/0055376 A1 | 2/2016 | Koduru |
| 2016/0063269 A1 | 3/2016 | Liden |
| 2016/0078368 A1 | 3/2016 | Kakhandiki et al. |
| 2017/0270431 A1 | 9/2017 | Hosabettu |
| 2018/0113781 A1 | 4/2018 | Kim |
| 2018/0210824 A1 | 7/2018 | Kochura |
| 2018/0218429 A1 | 8/2018 | Guo et al. |
| 2018/0275835 A1 | 9/2018 | Prag |
| 2018/0276462 A1 | 9/2018 | Davis |
| 2018/0321955 A1 | 11/2018 | Liu |
| 2018/0349730 A1 | 12/2018 | Dixon |
| 2018/0370029 A1 | 12/2018 | Hall |
| 2018/0375886 A1* | 12/2018 | Kirti ............... H04L 63/1425 |
| 2019/0005050 A1 | 1/2019 | Proux |
| 2019/0026215 A1 | 1/2019 | Agarwal |
| 2019/0028587 A1 | 1/2019 | Unitt |
| 2019/0034041 A1 | 1/2019 | Nychis |
| 2019/0095440 A1 | 3/2019 | Chakra |
| 2019/0114370 A1 | 4/2019 | Cerino |
| 2019/0126463 A1 | 5/2019 | Purushothaman |
| 2019/0141596 A1 | 5/2019 | Gay |
| 2019/0213822 A1 | 7/2019 | Jain |
| 2019/0250891 A1 | 8/2019 | Kumar |
| 2019/0266692 A1 | 8/2019 | Stach et al. |
| 2019/0317803 A1 | 10/2019 | Maheshwari |
| 2019/0324781 A1 | 10/2019 | Ramamurthy |
| 2019/0340240 A1 | 11/2019 | Duta |
| 2019/0377987 A1 | 12/2019 | Price et al. |
| 2020/0019767 A1 | 1/2020 | Porter et al. |
| 2020/0034976 A1 | 1/2020 | Stone et al. |
| 2020/0059441 A1 | 2/2020 | Viet |
| 2020/0097742 A1 | 3/2020 | Kumar et al. |
| 2020/0104350 A1 | 4/2020 | Allen |
| 2020/0104511 A1* | 4/2020 | Stolfo ............... H04L 67/131 |
| 2020/0147791 A1 | 5/2020 | Safary |
| 2020/0151444 A1 | 5/2020 | Price et al. |
| 2020/0151591 A1 | 5/2020 | Li |
| 2020/0159647 A1 | 5/2020 | Puszkiewicz |
| 2020/0159648 A1 | 5/2020 | Ghare |
| 2020/0249964 A1 | 8/2020 | Fernandes |
| 2020/0285353 A1 | 9/2020 | Rezazadeh Sereshkeh |
| 2020/0311210 A1 | 10/2020 | Nama |
| 2020/0334249 A1 | 10/2020 | Canim |
| 2021/0049128 A1 | 2/2021 | Kernick |
| 2021/0107140 A1 | 4/2021 | Singh |
| 2021/0141497 A1 | 5/2021 | Magureanu |
| 2021/0216334 A1 | 7/2021 | Barrett |
| 2021/0279166 A1 | 9/2021 | Peng |
| 2022/0245936 A1 | 8/2022 | Valk |
| 2022/0405094 A1 | 12/2022 | Farquhar |
| 2023/0052190 A1 | 2/2023 | Goyal et al. |
| 2023/0053260 A1 | 2/2023 | Goyal et al. |

OTHER PUBLICATIONS

B.P. Kasper "Remote: A Means of Remotely Controlling and Storing Data from a HAL Quadrupole Gas Analyzer Using an IBM-PC Compatible Computer", Nov. 15, 1995, Space and Environment Technology Center.

Bergen et al., RPC automation: making legacy code relevant, May 2013, 6 pages.

Hu et al., Automating GUI testing for Android applications, May 2011, 7 pages.

Konstantinou et al., An Architecture for virtual solution composition and deployment in infrastructure clouds, 9 pages (Year: 2009).

Nyulas et al., An Ontology-Driven Framework for Deploying JADE Agent Systems, 5 pages (Year: 2006).

Tom Yeh, Tsung-Hsiang Chang, and Robert C. Miller, Sikuli: Using GUI Screenshots for Search and Automation, Oct. 4-7, 2009, 10 pages.

Yu et al., Deploying and managing Web services: issues, solutions, and directions, 36 pages (Year: 2008).

Zhifang et al., Test automation on mobile device, May 2010, 7 pages.

Zhifang et al., Test automation on mobile device, May 2010, 7 pages.

Non-Final Office Action for U.S. Appl. No. 17/230,492, dated Oct. 14, 2022.

Notice of Allowance for U.S. Appl. No. 16/398,532, dated Oct. 23, 2022.

Non-Final Office Action for U.S. Appl. No. 16/876,530, dated Sep. 29, 2020.

Final Office Action for U.S. Appl. No. 16/876,530, dated Apr. 13, 2021.

Notice of Allowance for U.S. Appl. No. 16/876,530, dated Jul. 22, 2021.

Dai, Jifeng et al., "R-fcn: Object detection via region-based fully convolutional networks", Advances in neural information processing systems 29 (2016). (Year: 2016).

Ren, Shaoqing et al., "Faster r-cnn: Towards real0time object detection with region proposal network." Advances in neutral information processing systems 28 (2015). (Year: 2015).

International Search Report for PCT/US2021/053669, dated May 11, 2022.

Embley et al., "Table-processing paradigms: a research survey", International Journal on Document Analysis and Recognition, vol. 8, No. 2-3, May 9, 2006, pp. 66-86.

Non-Final Office Action for U.S. Appl. No. 16/925,956, dated Sep. 16, 2021.

Notice of Allowance for U.S. Appl. No. 16/925,956, dated Jan. 7, 2022.

Pre-Interview Office Action for U.S. Appl. No. 16/398,532, dated Jul. 8, 2022.

Notice of Allowance for U.S. Appl. No. 16/398,532, dated Oct. 13, 2022.

Non-Final Office Action for U.S. Appl. No. 17/139,838, dated Feb. 22, 2022.

Final Office Action for U.S. Appl. No. 17/139,838, dated Nov. 15, 2022.

Notice of Allowance for U.S. Appl. No. 17/139,838, dated Apr. 5, 2023.

International Search Report and Written Opinion for PCT/US2021/015691, dated May 11, 2021.

A density-based algorithm for discovering clusters in large spatial databases with noise, Ester, Martin; Kriegel, Hans-Peter; Sander, Jorg; Xu, Xiaowei, Simoudis, Evangelos; Han, Jiawei; Fayyad, Usama M., eds., Proceedings of the Second International Conference on Knowledge Discovery and Data Mining (KDD-96). AMI Press. pp. 226-231 (1996).

Deep Residual Learning for Image Recognition, by K. He, X. Zhang, S. Ren, and J. Sun, arXiv:1512.03385 (2015).

(56) References Cited

OTHER PUBLICATIONS

FaceNet: A Unified Embedding for Face Recognition and Clustering, by F. Schroff, D. Kalenichenko, J. Philbin, arXiv:1503.03832 (2015).

Muhammad et al. "Fuzzy multilevel graph embedding", copyright 2012 Elsevier Ltd.

Sharma et al. Determining similarity in histological images using graph-theoretic description and matching methods for content-based image retrieval in medical diagnostics, Biomed Center, copyright 2012.

First Action Interview Pilot Program Pre-Interview communication for U.S. Appl. No. 16/779,462, dated Dec. 3, 2021.

Reply under 37 CDT 1.111 to Pre-Interview Communication for U.S. Appl. No. 16/779,462, filed Jan. 25, 2022.

Notice of Allowance for U.S. Appl. No. 16/779,462 dated Feb. 9, 2022.

Notice of Allowance for U.S. Appl. No. 17/131,674, dated Jun. 22, 2023.

Non-Final Office Action for U.S. Appl. No. 16/731,044, dated Jan. 25, 2021.

Notice of Allowance for U.S. Appl. No. 16/731,044, dated May 5, 2021.

Non-Final Office Action for U.S. Appl. No. 18/126,935, dated Jul. 13, 2023.

Non-Final Office Action for U.S. Appl. No. 17/139,842, dated Jul. 18, 2023.

Notice of Allowance for U.S. Appl. No. 17/588,588, dated Aug. 2, 2023.

Pre-Interview Office Action for U.S. Appl. No. 16/859,488, dated Jan. 25, 2021.

First Action Interview for U.S. Appl. No. 16/859,488, dated Mar. 22, 2021.

Final Office Action for U.S. Appl. No. 16/859,488, dated Jul. 8, 2021.

Notice of Allowance for U.S. Appl. No. 16/859,488, dated Mar. 30, 2022.

Final Office Action for U.S. Appl. No. 17/463,494, dated Sep. 6, 2023.

Final Office Action for U.S. Appl. No. 17/160,080, dated Sep. 11, 2023.

Final Office Action for U.S. Appl. No. 17/534,443, dated Sep. 11, 2023.

Final Office Action for U.S. Appl. No. 16/930,247 dated Oct. 12, 2023.

Notice of Allowance for U.S. Appl. No. 17/534,443 dated Oct. 24, 2023.

International Search Report and Written Opinion for PCT/US2022/013026, dated Sep. 21, 2022.

* cited by examiner

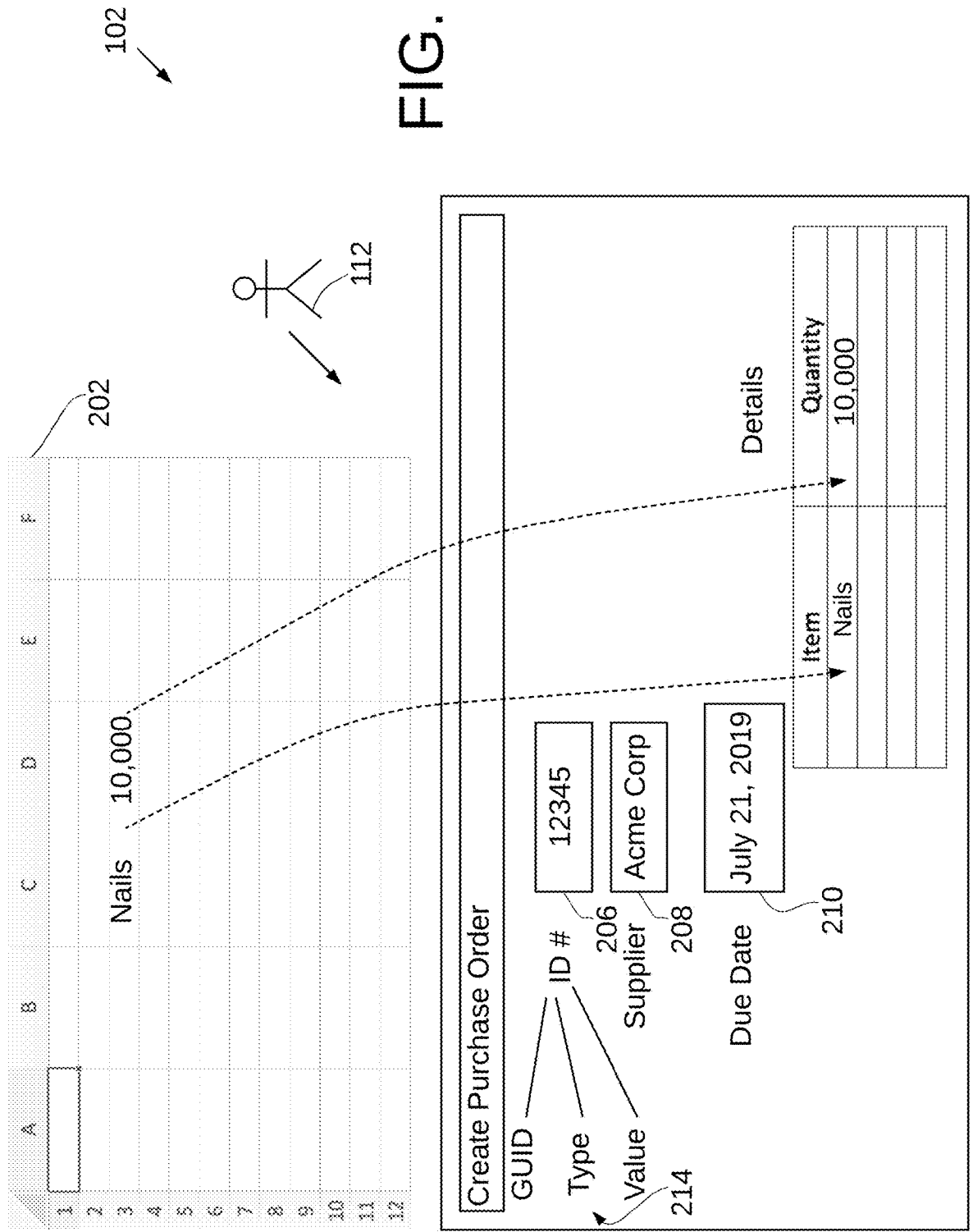

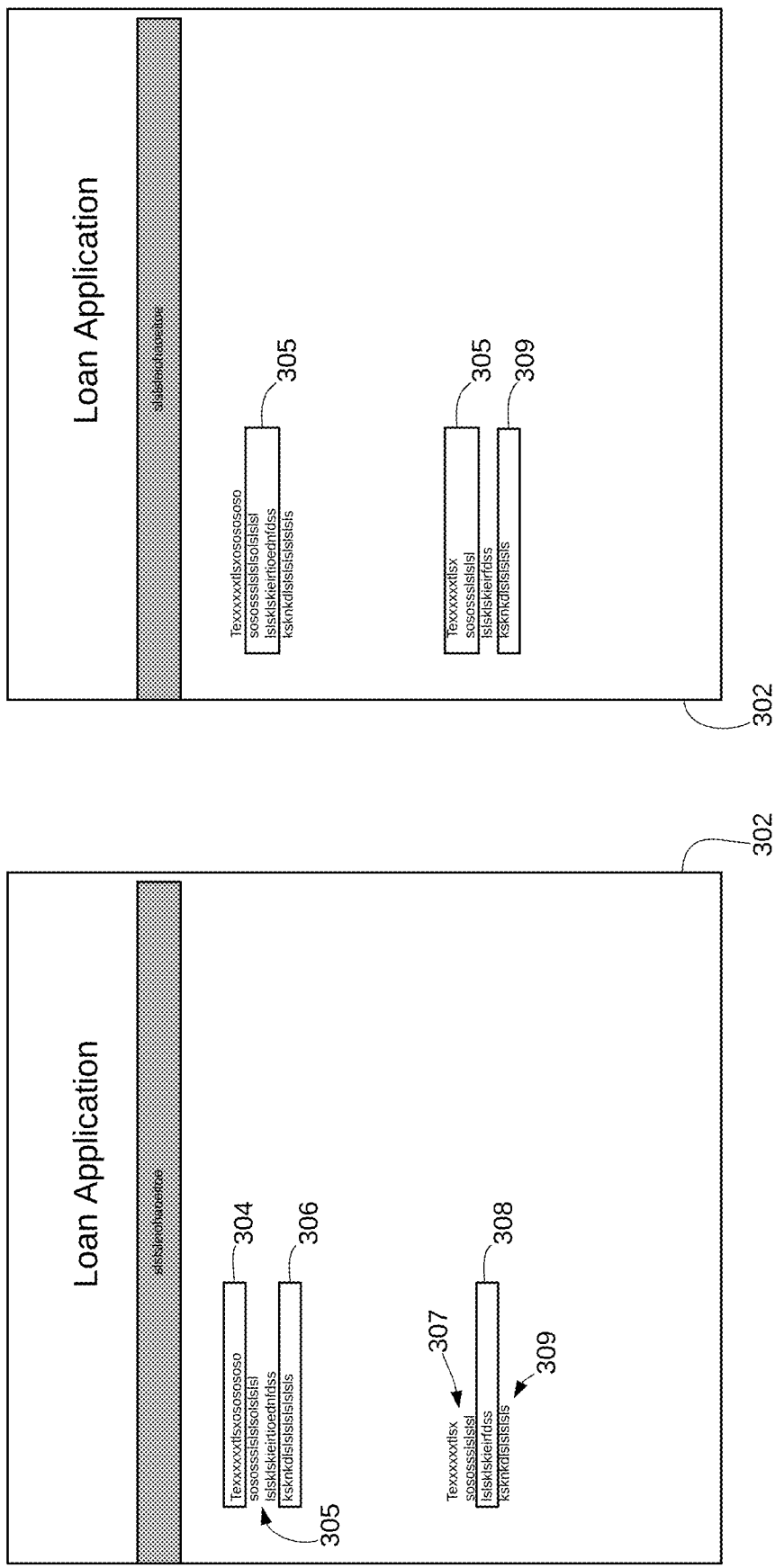

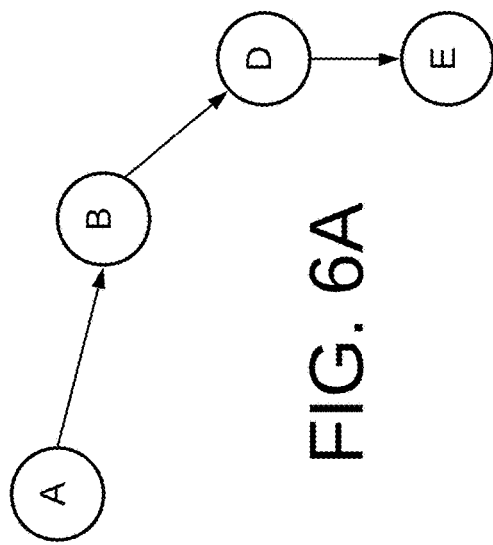
FIG. 6A
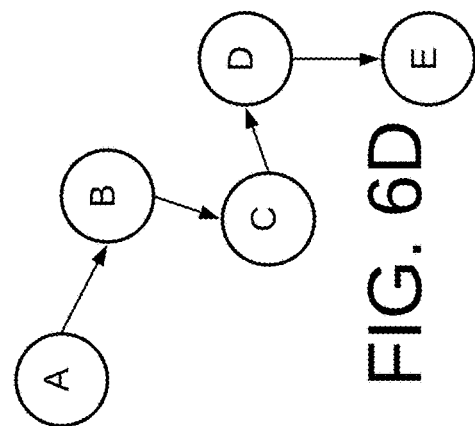
FIG. 6D
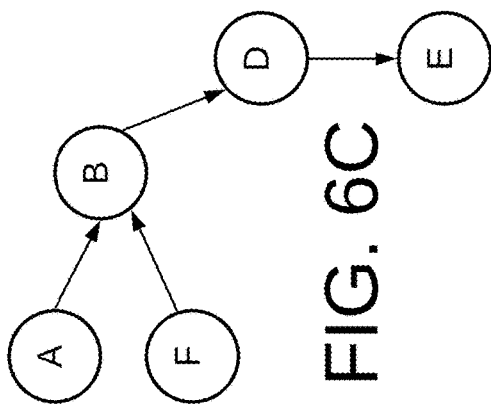
FIG. 6C
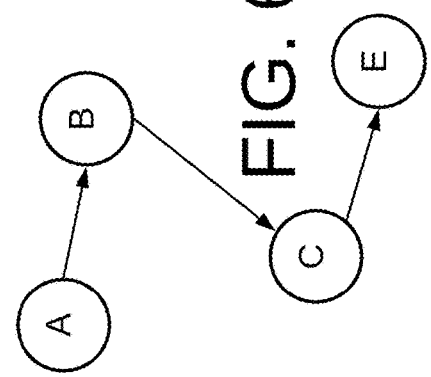
FIG. 6B
| Task | Pattern | Instances |
|---|---|---|
| Create Purchase Order | 1 | 2400 |
| | 2 | 200 |
| | 3 | 1300 |
| | 4 | 1000 |
FIG. 5

USER ACTION GENERATED PROCESS DISCOVERY

CROSS REFERENCE TO RELATED APPLICATION

This application is a continuation of U.S. patent application Ser. No. 16/724,308, filed Dec. 22, 2019, and entitled "USER ACTION GENERATED PROCESS DISCOVERY," the content of which is hereby incorporated by reference.

FIELD OF THE DISCLOSURE

This disclosure relates generally to the field of data processing systems and more particularly to computerized task automation.

BACKGROUND

Organizations are increasingly seeking to automate repetitive business processes. One effective approach is by way of Robotic Process Automation (RPA) which is the application of technology that allows workers in an organization to configure a computer software program, (also referred to as a "robot" or "bot") to capture and interpret existing applications for processing a transaction, manipulating data, triggering responses and communicating with other digital systems. Conventional RPA systems employ software robots to interpret the user interface of third-party applications and to execute steps identically to a human user. While this has proven very useful in automating repetitive business tasks, identifying tasks for automation and then generating the software robot(s) to automate such tasks can be an involved process often necessitating the involvement of individuals with expertise in a variety of fields including RPA. This can be justified when automating significant processes within an organization. It is often difficult though to justify such resources when identifying and automating processes that are not quite as important and/or well known within an organization. A suggested solution, (see, e.g. https://www.mimica.ai and https://www.fortressiq.com), is to record over a period of time the activities of a user on their computer. The recorded data can then be processed to generate a type of process map that may be used to guide and help develop automated tasks to replace the manual operations performed by the user whose actions have been recorded. While this can simplify the identification and automation of computer-implemented tasks, there remains a need for improved computerized techniques to identify and automate computer-implemented tasks that are currently performed manually or are partially automated.

SUMMARY

The benefits of RPA may be easily extended to many manually generated tasks by way of the disclosed embodiments. A robotic process automation system is disclosed herein including a plurality of automated software robots, each of which when deployed performs a sequence of actions with respect to one or more computer applications on a designated computer system with an identity and credentials of a designated human user to process one or more work items. The system simplifies bot identification and creation by recording, over a period of time, inputs of a computing device user to generate a log of inputs by the user in connection with one or more task applications, where the task applications comprise one or more applications with which the user interacts to perform a first task. The system stores inputs of the user along with information pertaining to the one or more task applications. The log is processed to identify the one or more task applications to generate a user action file. The log is further processed to identify fields in the task applications with which the user entered inputs and storing the identified fields to the user action file. The user action file is processed to identify one or more actions performed by the user with respect to the identified task applications. The one or more actions performed by the user are compared with respect to the identified task applications to actions performed by a set of automated software robots and if a match is identified then a user, such as an administrator is notified of the match. If a match is not identified then a new automated software robot is generated and is encoded with instructions to perform automatically, when invoked, the actions performed by the user with respect to the identified task applications.

Additional aspects related to the invention will be set forth in part in the description which follows, and in part will be apparent to those skilled in the art from the description or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive techniques disclosed herein. Specifically:

FIG. 2 is an illustration of user activities that may be automated.

FIGS. 3A and 3B illustrate operation of the rules shown in FIG. 1.

FIG. 5 shows a table with sample results of task identification.

FIGS. 6A, 6B, 6C and 6D are illustrations of directed graphs showing variants of a particular task.

DETAILED DESCRIPTION

In the following detailed description, reference will be made to the accompanying drawings, in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

Figure 1:
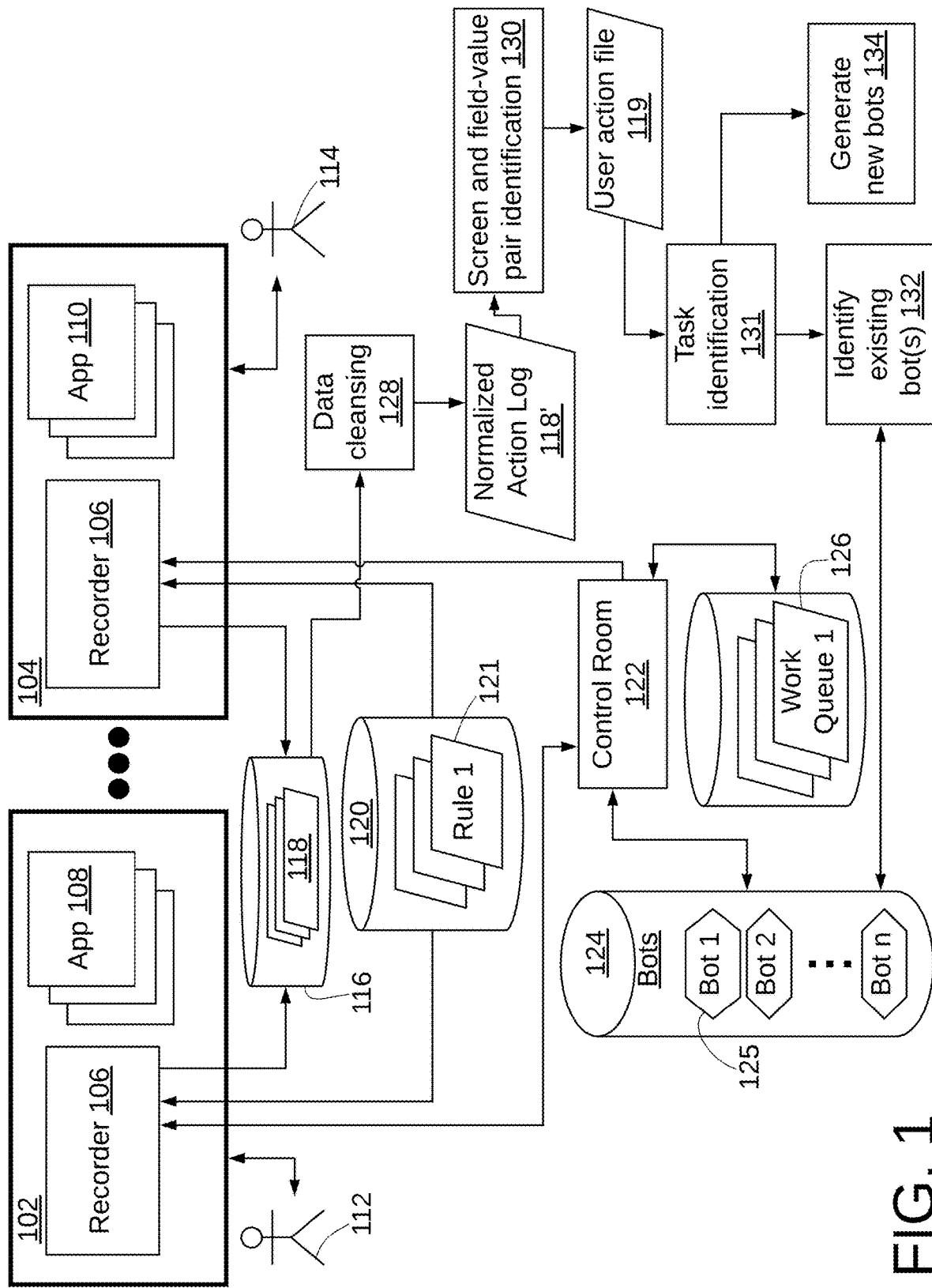
FIG. 1 is a high-level block diagram illustrating operation of an embodiment of an RPA system 10 with automated process discovery.

FIG. 1 is a high-level block diagram illustrating operation of an embodiment of an RPA system 10 with automated process discovery. Computer devices 102 and 104 each execute an RPA recorder 106 and a plurality of applications (App) 108 (on device 102) and 110 (on device 104). User 112 interacts with device 102 and user 114 interacts with device 104. Each of the devices 102 and 104 may take the form of a conventional computing device such as a laptop computer, desktop computer, tablet or smartphone. Recorders 106 operate to record actions of user 112/114 and store the recorded actions to storage 116 in the form of action logs 118. The recorders 106 may take the form of bot creator software available from Automation Anywhere, Inc. Recorders 106 may employ one or more rules 121 stored in a storage 120 to limit the actions recorded of users 112/114, to, for example, protect privacy of the user's actions.

Certain tasks performed by certain users may be automated by way of bots 125. User's employing a bot 125 to automate a task interact with the RPA system 10 by way of control room module 122 which operates to control processing of tasks within work queues 126. Examples of such tasks, as noted above are invoices, new hire onboarding documents and expense reports. These are simple examples and many other tasks may be processed with RPA system 10. Each work queue (Q1, Q2, . . . , Qn) preferably includes a set of data (work item) that maps to a specific data type. For example, Q1 may contain invoices, Q2 may contain new hire onboarding documents, etc. The records in each queue 126 are processed by a bot 125 stored in storage 108. The various storage mechanisms such as 124, 120 are shown separately for simplicity of explanation but may constitute any of a number of forms of storage such as separate storage systems or a single integrated storage system. Embodiments disclosed herein provide the capability to identify tasks that are not manually performed by a user and to generate a bot 125 that automates the manual task.

The recorders 106 operate under control of control room 122 that controls deployment of the recorders 106. Control room 122 permits system management of the system 10 by providing (i) user management to control and authorize users of the system, (ii) source control to manage development and deployment of bots 125, (iii) a dashboard to provide analytics and results of bots 125, and (iv) license management to permit usage by licensed users. The control room 122 is configured to execute instructions that when executed cause the RPA system 10 to respond to a request from a client device 102, 104 that is issued by a user 112, 114 to act as a server to provide to the client device the capability to perform an automation task to process a work item from the plurality of work items 126. The user interacts with the control room 122 to schedule automation tasks to be performed on one or more devices as if the user were manually interacting with the necessary application program(s) and the operating system of the devices to perform the tasks directly. The control room 122 holds all software application license and user information. The control room 122 also tracks all bots that have been deployed and knows the status of all deployed bots.

The action logs 118 are each processed by data cleansing module 128 to remove extraneous user actions, to transform the data as required, such as normalizing the data as required for identification of the contents of the screens viewed by the viewer and the actions taken by the user. An example of an extraneous user action is mouse movements that result in no action, and actions that are undone by the user. Each cleaned and normalized action log 118' is then processed at 130 to identify the user actions. This is performed by recognizing the application(s) with which the user interacts and the field(s) within each application with which the user interacts, such as by taking an action as permitted by a particular user interface object or by entering data. In some instances, the recorder 106 may have access to the metadata of an application with which the user is interacting. This would occur for example with a web-based application where the fields displayed to the user would be discernable by the HTML file being rendered by the user's browser. In such an instance identification of the field with which the user is interacting and any action taken, or value entered by the user is readily discernable by processing the code provided by the web-based application to the user's browser to render the application screen in the user's browser. Desktop based applications may not necessarily expose as much information as a web-based application. Also, information regarding application fields, objects, controls etc, will not be as easily discernable if, for example the user is remotely located and is interacting with the RPA system 10 via a compliance boundary such as described in System and Method for Compliance Based Automation, filed in the U.S. Patent Office on Jan. 6, 2016, and assigned application Ser. No. 14/988,877, which application is assigned to the assignee of the present application and which application is hereby incorporated by reference in its entirety. In such instances, processing will need to be performed to automatically identify application fields from the screen image being displayed to the user. Such processing can include the use of a fingerprint generator such as described in DETECTION AND DEFINITION OF VIRTUAL OBJECTS IN REMOTE SCREENS, filed in the U.S. Patent Office on Apr. 19, 2018 and assigned application Ser. No. 15/957,030, which application is assigned to the assignee of the present application and which application is hereby incorporated by reference in its entirety. As described in the aforementioned '030 application, a fingerprint generator analyzes an image file for various objects, such as automation controls (markers) and their locations. The combination of various objects, object metadata, properties and types, and location on the screen is used to generate a unique set of keys that can together represent a "fingerprint" or signature of that screen that assists in recognition of that specific screen, among a database of any other possible screens. Additional aspects of such an operation are disclosed in patent application entitled System And Method For Resilient Automation Upgrade filed in the U.S. Patent Office on Aug. 25, 2015 and assigned application Ser. No. 14/834,773, which application is assigned to the assignee of the present application and which application is hereby incorporated by reference in its entirety.

The recognition of application fields and the data contained within a recognized field in an image file may also be performed as described in AUTOMATIC KEY/VALUE PAIR EXTRACTION FROM DOCUMENT IMAGES USING DEEP LEARNING, filed in the U.S. Patent Office on Dec. 29, 2017, and assigned application Ser. No. 15/858, 976, which application is assigned to the assignee of the present application and which application is hereby incorporated by reference in its entirety. The recognition of visual application objects with which a user interacts may be performed as described in AUTOMATED DETECTION OF CONTROLS IN COMPUTER APPLICATIONS WITH REGION BASED DETECTORS, filed in the U.S. Patent Office on Jul. 31, 2019, and assigned application Ser. No. 16/527,048, which application is assigned to the assignee of the present application and which application is hereby incorporated by reference in its entirety. The recognition of text in a screen image of an application may be performed as described in OPTICAL CHARACTER RECOGNITION EMPLOYING DEEP LEARNING WITH MACHINE GENERATED TRAINING DATA, filed in the U.S. Patent Office on Dec. 21, 2017, and assigned application Ser. No. 15/851,617, which application is assigned to the assignee of the present application and which application is hereby incorporated by reference in its entirety. A commercially available implementation of the ability to recognize objects and application controls in applications, including web-based applications, desktop applications and those employed via compliance interface, such as via a Citrix server, may be obtained from Automation Anywhere, Inc. in the form of its Object Cloning functionality.

The output of screen and field-value pair identification module 130 is a user action file 119 containing a sequential listing of actions taken by the user with an identification of the application with which the user interacts and the fields within each application that the user interacts with. The user action file 119 is then processed by task identification module 131, in a manner described in connection with FIGS. 4A, 4B, 4C and 4D, to identify tasks performed manually by the user. Identified tasks may then be used at 132 to identify existing bots 125. Occasionally there may be an exact match but more often there may be some degree of overlap with an existing bot and the task can be modified to match the existing bot or the existing bot can be copied and easily modified. It should be noted that the bots 125 may have been developed by other organizations which employ a sharing facility such as provided by the Bot Store from Automation Anywhere, Inc. Such a facility significantly enhances the chance of finding a similar bot to automate an identified manual task. Additionally, or alternatively, a new bot may be created at 134 to automate the identified manual task. The details of the tasks identified by task identification 131 greatly simplify the bot creation process and in some cases the output of the task identification 131 may be used to automatically create a bot. An example of a collection of bots that may be searched at 132 is the Bot Store, offered by Automation Anywhere, Inc., (see, https://botstore.automationanywhere.com). An example of bot creation, such as at 134, is disclosed in a patent application entitled Robotic Process Automation System with Hybrid Workflows filed in the U.S. Patent Office on May 13, 2019 and assigned application Ser. No. 16/410,999, which application is assigned to the assignee of the present application and which application is hereby incorporated by reference in its entirety.

FIG. 2 is an illustration of user activities that may be performed by user 112 or 114. In FIG. 2, a user (for example user 112) has open on device 102 a spreadsheet application 202 and a purchase order application 204. The user 112 is performing a task to create a purchase order using application 204. This task requires the user to fill in a variety of information fields in the purchase order application 204 including supplier ID 206, supplier name 208, due date 210, and details 212 of the items to be supplied by the supplier including item description and quantity. Some of the fields such as supplier ID 206 or supplier name 208 may already contain data. In the example shown in FIG. 2, the user 112 is entering data for the details 212 regarding item and quantity of goods to be provided by the supplier. This is performed by opening a spreadsheet file 202 which contains information regarding quantity and data of items to be provided by the supplier in question. The spreadsheet may have been generated by someone else within user 112's organization or in some cases by the supplier itself. The user 112 is performing a conventional copy-paste operation to copy data in a cell in spreadsheet 202 and to paste the copied data to a field in application 204. The user 112's actions are recorded by recorder 106 in the manner described above in connection with FIG. 1. Also recorded are the fields displayed by the application 204. Each field has associated with it three different values, seen generally at 214: a Graphical User ID (GUID) value that uniquely identifies the field within the application 204, a type value that identifies the type of data contained in the field (text, integer, real number, date, check box), and a value for the field. This type of information enables the recorder 106 to capture information about what is being displayed that is not actually visible to the user. The window displayed by the application 204 is unique in the information contained in the window. In other words the each screen of information displayed by the application 204 contains a unique combination of fields, and each screen therefore can be associated with a unique identifier or fingerprint, thereby enabling a determination of the fields of information entered by a user and the actions taken by the user with respect to a particular screen. The recorder 106 also records the file name for the spreadsheet file 202 and the row/column identifiers of the cells in the spreadsheet upon which the user is taking action (eg. copy, data entry, paste). The recorder 106 also records the aforementioned action and the action taken in the fields 212 in application 204 (eg. paste, or data entry in the event the user is manually entering the data instead of pasting it). The recorder 106 therefore is able to record all of the details of the user 112's actions, to enable such actions to be reproduced automatically.

FIGS. 3A and 3B illustrate operation of the rules 121. Some tasks may involve the user being exposed to information that is sensitive and/or protected by regulation, such as personally identifiable information, or medical or BFSI (Banking, Financial Services, and Insurance) Information. Recording of such information by way recorder 106 may be problematic from a security, or privacy or other regulatory perspective. The rules 121 permit configuration by a system administrator of the system 10 to prevent designated information from being captured by the recorder 106. This is illustrated in FIG. 3A where a document associated with a loan application is shown. The information in fields 304, 306 and 308 is BFSI and its availability is desired to be highly restricted. There is no restriction on information contained in fields shown at 305, 307 (two fields are shown at each reference number and are designated for simplicity of illustration with one reference number), and 309. The administrator of the system 10 can designate that information contained in fields 304, 306 and 308 of the loan application document 302 not be recorded by recorder 106. Information in the remaining fields in the document 302 may be recorded under this approach, which may be designated as a black list approach. Another approach supported is the opposite approach shown in FIG. 3B, designated as a white list approach, where information in fields that may be recorded is designated and information in any other field may not be recorded. As seen, the two fields shown at each of 305 and 307 are selected along with field 309. In this approach, only the information in the fields 305, 307 and 309 may be recorded with information in any other field in document 302 not being recorded by recorder 106.

In another embodiment, the availability of information may be further restricted by use of techniques disclosed in pending patent application entitled ROBOTIC PROCESS AUTOMATION WITH SECURE RECORDING, filed on Jan. 29, 2018 and assigned application Ser. No. 15/883,020, which application is assigned to the assignee of the current application and which application is hereby incorporated by reference in its entirety. This application describes an RPA system that provides a secure recording mode that is responsive to an operator accessible setting, that prevents presentation of full screen images, and that permits presentation of one or more selected data fields and associated labels within one or more of the full screen images. In such an embodiment, the information desired to be protected is not displayed to the user 112.

Figure 4A:
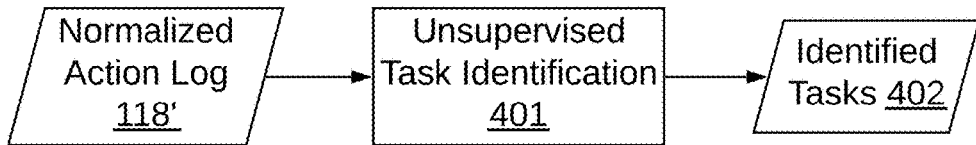
FIGS. 4A, 4B, 4C and 4D are block diagrams illustrating different embodiments for identifying tasks.
Figure 4B:
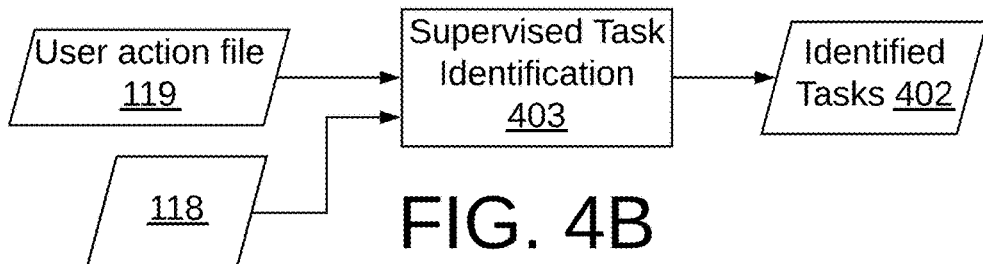

FIGS. 4A, 4B, 4C and 4D are block diagrams illustrating different embodiments for identifying tasks recorded into action logs 118. Task identification may be performed manually or automatically, or via combinations of manual and automated identification. The identification is performed on the user action file 119. FIG. 4A illustrates unsupervised task identification 401 where automated techniques are employed to recognize tasks in the user action file 119 to generate a recognized task 402. Supervised task identification 403 is illustrated in FIG. 4B. In supervised task identification 403, a user may be provided a sequence of screen shots and input actions stored in user action file 119 and be asked to identify the task being performed to generate a recognized task 402. In some instances, it may be more beneficial to show the user the raw action log 118 to provide a more realistic set of images showing the actions performed. For example, if shown the sequence of screen shots and actions taken with respect to the example shown in FIG. 2 the user may be asked to identify the task being performed. The user upon seeing the screen shots may then identify the sequence of actions as a "Create Purchase Order" task. A subsequent user when seeing the same or similar series of tasks may then be shown a listing of already identified tasks, including the Create Purchase Order task along with other already identified tasks. The user may select from one of the already identified tasks or may choose to enter a new task.

Figure 4C:
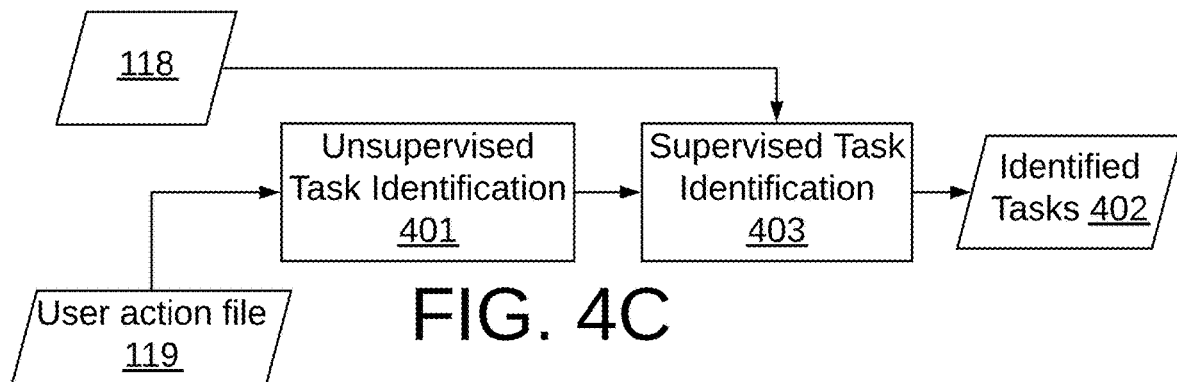

FIG. 4C illustrates an embodiment where both unsupervised 401 and supervised 403 task identification are performed sequentially to generate an identified task 402. In FIG. 4C unsupervised task identification 401 is employed to identify tasks and to group together like tasks. The results can then be refined by supervised task identification 403 where a user is shown the sequence of action for each task identified at 401 and then provided the opportunity to change the identification or to confirm the identification. For each task identified by 401, the user may be provided the corresponding screen shots of the unfiltered log to provide a more realistic representation of the actions taken. In some instances, the supervised task identification 403 may have grouped together dissimilar tasks or may have identified slightly different sequences of actions as different tasks when they are in fact the same task.

Figure 4D:
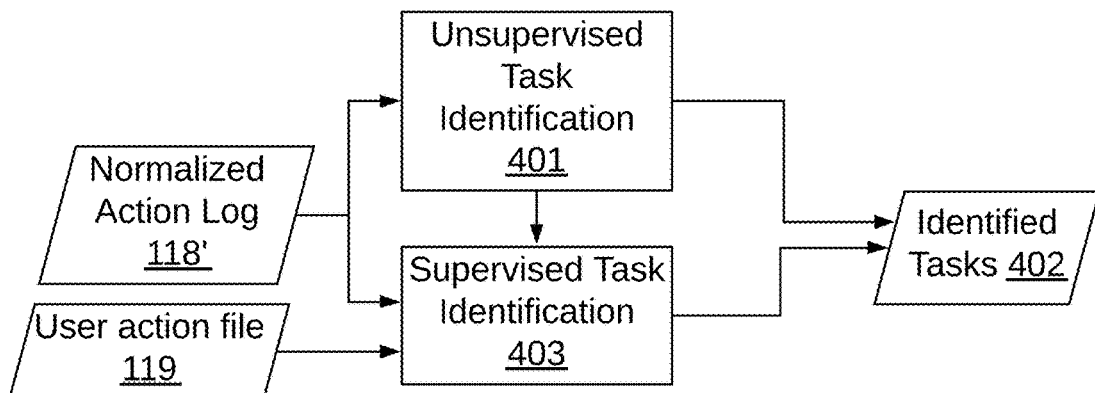
Figure 7B:
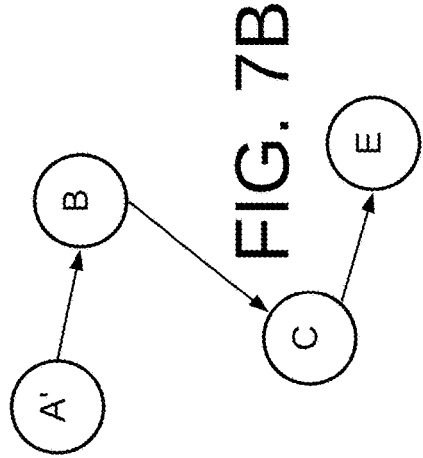
FIGS. 7A, 7B, 7C and 7D are illustrations of directed graphs showing further variants of a particular task.
Figure 7D:
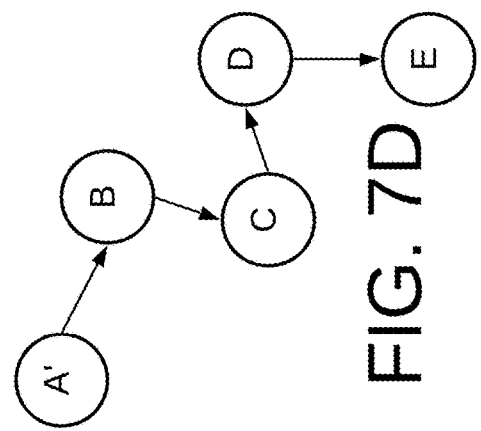
Figure 7A:
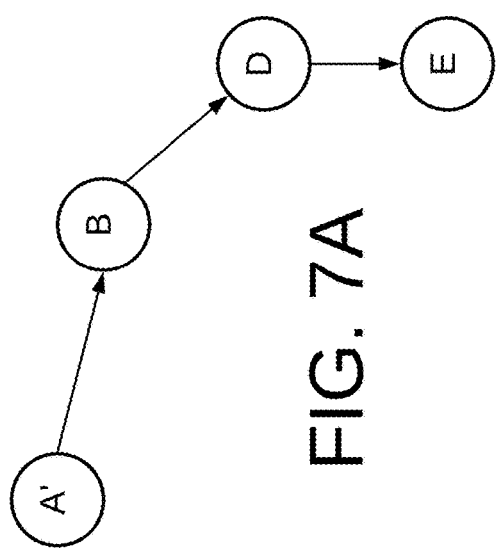
Figure 7C:
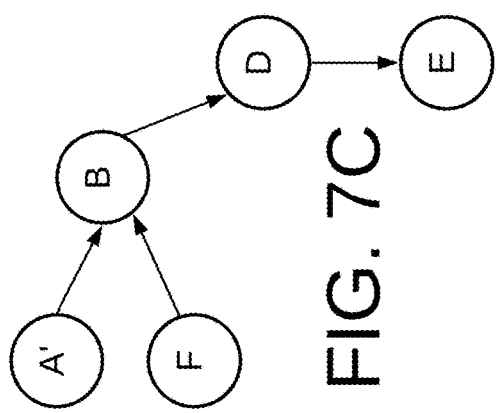
Figure 8B:
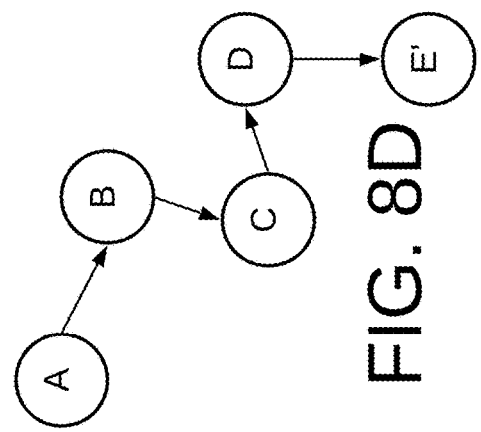
FIGS. 8A, 8B, 8C and 8D are illustrations of directed graphs showing further variants of a particular task.
Figure 8A:
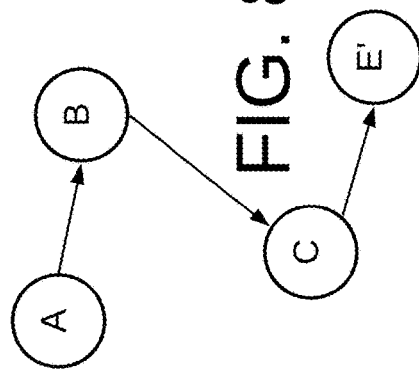
Figure 8D:
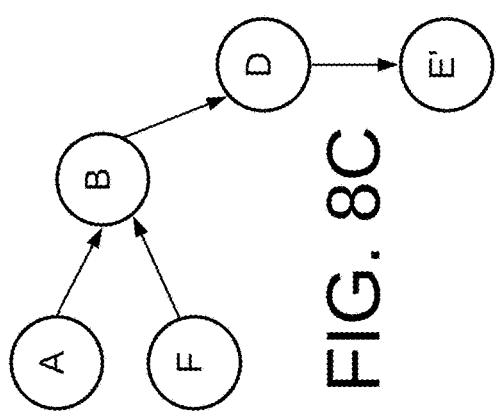
Figure 8C:
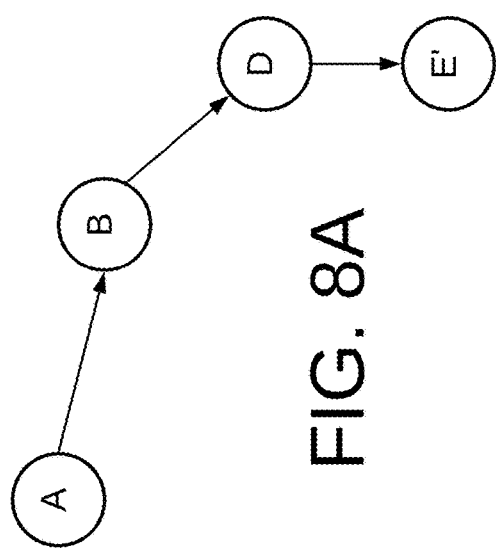

The embodiments in FIGS. 4A, 4B and 4C are not necessarily mutually exclusive and FIG. 4D illustrates an embodiment employing a combination of the approaches shown in FIGS. 4A, 4B and 4C. In the embodiment of FIG. 4D, both unsupervised 401 and supervised 403 task identification are performed independently to each generate identified tasks. In addition, the results of unsupervised task identification 401 can be provided to supervised task identification module 403 for refinement as explained above in connection with FIG. 4C.

The unsupervised task identification engine 401 may be implemented by way of a trained Deep Neural Network (DNN). The initial training of such a DNN may be performed by generating the user action file from existing bots which are encoded to perform user level actions in conjunction with application programs. This training can then be refined with the results of the supervised task identification 403. The continued generation of data by more automated tasks implemented by bots will further improve the identification ability of the DNN.

An example of the results of task identification is shown in the table in FIG. 5. If the task identification is performed by multiple people over a period of time, the results may be as shown in FIG. 5 where the task Create Purchase Order is identified as occurring in four different patterns with the number of instances for each pattern as shown in FIG. 5. The different patterns for a single task result from the fact that users may perform the task in slightly different ways. For example, a user may enter the Purchase Order application shown in FIG. 2 or the Loan Application shown in FIGS. 3A-B from different actions, such as by selecting a bookmark in a browser, or by selecting a URL for the application from an email or elsewhere, or by using a different browser. Also, while performing the task the user may manually enter a field one time and the same user a different time, or a different user may enter the same data by selecting a drop down. Also, the sequence of data entry and other tasks may vary among users and by the same user on different occasions.

Examples of different patterns that may arise are shown in FIGS. 6A-6D in which user actions are represented as a directed graph where each user action (and the accompanying recognized field(s) and application(s) with which the user is interacting) is represented as a vertex and the relationship between an action and a subsequent action being represented by an edge. As seen, each of the identified patterns starts with action (vertex) A, ends in action E and has the intermediate action of B following action A. The patterns vary though a bit in the intermediate actions. In FIG. 6A, the patterns include sequentially, steps A, B, D, E. In FIG. 6B, the patterns include sequentially steps A, B, C E. In FIG. 6C, the steps are the same as in FIG. 6A with the addition that another step (F) feeds into step B. In FIG. 6D, both steps C and D are performed. The differences, as noted above can arise from the multiple options provided by application software to perform a particular task. The differences may also arise from a substantive difference in the steps performed. Conventional techniques may be employed to determine the level of similarity between directed graphs, such as described for example by Pierre-Antoine Champin and Christine Solnon in *Measuring the similarity of labeled graphs*, LIRIS, bât. Nautibus, University of Lyon I, 43 Bd du 11 novembre, 69622 Villeurbanne cedex, France {champin, csolnon} @bat710.univ-lyon1.fr.

Figure 9B:
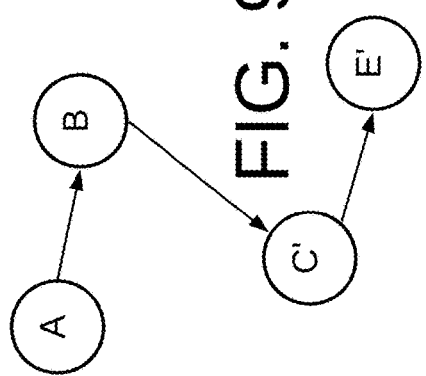
FIGS. 9A, 9B, 9C and 9D are illustrations of directed graphs showing further variants of a particular task.
Figure 9D:
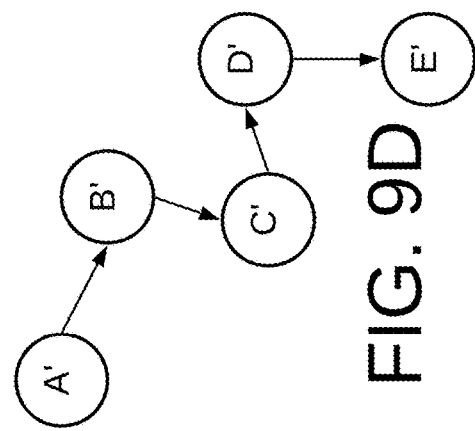
Figure 9A:
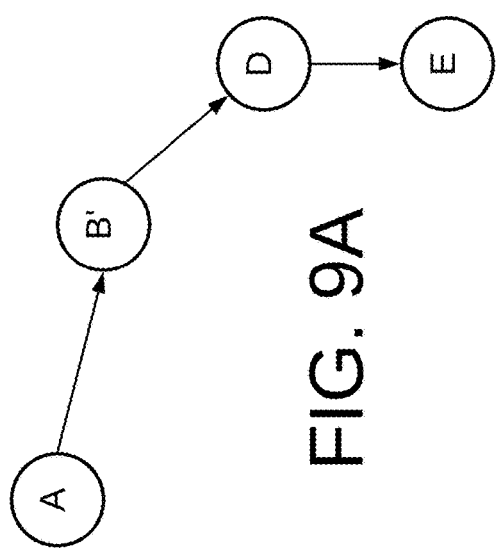
Figure 9C:
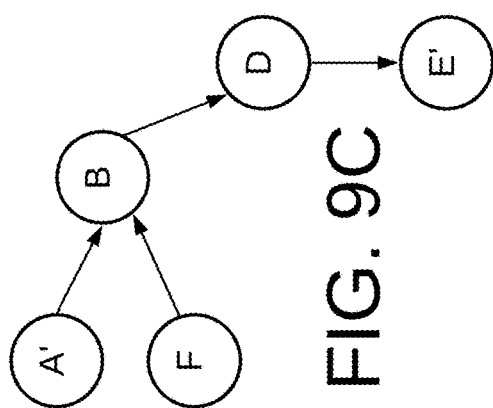

FIGS. 6A-6D illustrate patterns where the starting point and ending point are the same but where different paths may be taken between the starting and ending points. It may also be the case where the starting point may be slightly different, such as for example, where a process is started by opening a file. In the case of a spreadsheet, this may be performed either by selecting the file from within a menu in a spreadsheet application, or by selecting the file from within a folder/file viewer application provided by the operating system. Examples of different starting points from those shown in FIGS. 6A-6D are shown in FIGS. 7A-7D which shows A' as a starting point to reflect a different starting point than A in FIGS. 6A-6D. End points of a process may be accomplished slightly differently. For example, if the last act in a process is to save a file, this may be performed by way of a keyboard command, or by a menu selection. Examples of different ending point from those shown in FIGS. 6A-6D are shown in FIGS. 8A-8D which shows E' as an ending point to reflect a different ending point than E in FIGS. 6A-6D. Interim operations may also differ slightly and combinations of slight differences to a process may also commonly occur and this is shown in FIGS. 9A-9D. As seen in FIG. 9A, interim operation B has been modified to B'. In FIG. 9B, interim operation C has been modified to C' and final operation E has been modified to E'. In FIG. 9C, starting operation A has been modified to A' and final operation E has been modified to E'. In FIG. 9D, each of the operations, A, B, C, D and E have been modified to A', B', C', D' and E'.

Figure 10A:
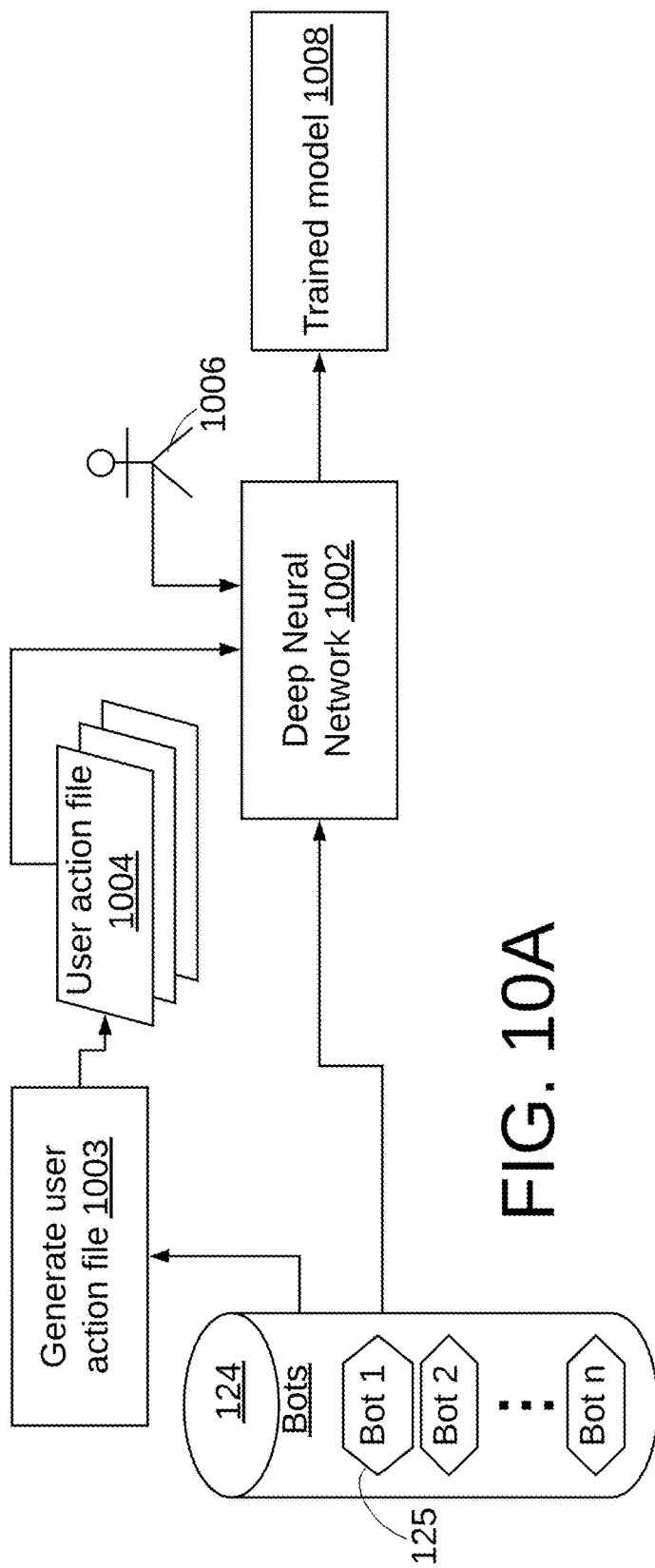
FIGS. 10A and 10B are block diagrams illustrating bot recognition.
Figure 10B:
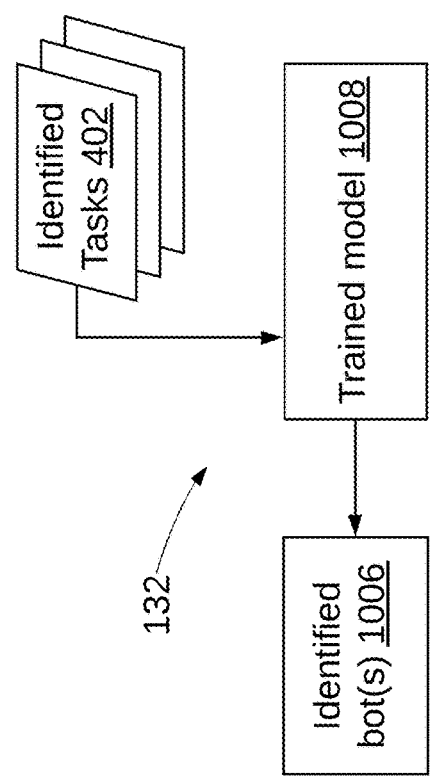

Existing bots 125 may be recognized by way of the operations shown in FIGS. 10A and 10B by way of a trained Deep Neural Network (DNN). The training of such a DNN 1002 may be performed by generating at 1003 a user action file 1004 from existing bots 125 which are encoded to perform user level actions in conjunction with application programs. The DNN 1002 is trained to recognize tasks in each of the various user action files 1004, which each contain tasks performed by one of the bots 125, as being performed by a bot 125. Variants, such as described in connection with FIGS. 6A-6D, 7A-7D, 8A-8D and 9A-9D may also be generated and included in each user action file 1004 to improve robustness of the training of the DNN 1002. Supervision by an operator 1006 may also be employed to improve the training. The result is a trained model 1008, which may be employed as seen in FIG. 10B to identify existing bot(s) (seen in FIG. 1 as operation 132). If an existing bot is identified the user(s) whose actions caused generation of the user action file 1003 may be notified, as may an administrator of the system 10 to cause usage of the identified bot to automate the manual actions of the user(s) in question. DNN's typically provide a confidence score with an output and the confidence score can be employed to determine if an acceptable match has been identified. For example, a threshold of a 90% confidence score may indicate a circumstance in which an existing bot performs the actions of the user(s) in question.

Generation of a new bot (seen in FIG. 1 as operation 134) from an identified task file 402 may be performed in some cases automatically and in some cases with some supervision. Conventional bot creation software may be employed such as available from Automation Anywhere, Inc. In one embodiment, the identified task file 402 is converted, if needed, to a format that may be read by such bot creation software which generates the necessary variables (such as user identity, authentication credentials, application identity, object identifiers) from the known values in the user action file. In some instances, instead of automatic creation the user may be presented with the identified tasks to a user in visual form to permit editing and creation of a bot 125. The bot creation process is greatly simplified by the automated process of task identification described herein. The bot creation software preferably modifies the identified tasks to include the appropriate variables required for repeated operation. The bot creation software determines the various alternative ways the task was executed and determines with or without human input, the rules/conditions responsible for alternate ways of task execution. The new bot is created automatically with or without using pre-existing bots available in the system and is immediately available for the user to test the automation.

An example of the various alternative ways that a task may be executed is as follows for execute a task called New Vendor Setup. Suppose User1 opens a structured data file, such as a CSV file, and pastes selected data from the file into a screen provided by an enterprise application, such as an accounts payable application, to create a first supplier (vendor). User2 opens different type of structured data file, such as created by default by a spreadsheet program such as Microsoft Excel, and pastes data into the same screen of the enterprise application as done by User1 to create a second supplier. User3 opens another application, for example an older legacy system, and transfers data from various fields of the legacy system into the enterprise application used by User1 and User2 to create a third supplier. These slightly different tasks are all variations of the same "New Vendor Setup" business process.

Creation of the bot includes generation of an execution file having one or more tasks for deployment. The tasks have command line arguments executable as variables by one or more remote computers. The command line arguments are assembled into a single execution file. The tasks are validated, and the nested tasks are organized by collecting nested task information for each task and accounting for all dependencies to ensure that files, tasks, and environments for running on one or more remote computers are present in the execution file. Creation of the execution file also includes scanning the tasks for event dependencies and embedding files and links needed for remote execution of the execution file. Dependencies are stored in a dependency file. The execution file and dependency file are scanned for security and verified for proper formatting.

The embodiments herein can be implemented in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The program modules may be obtained from another computer system, such as via the Internet, by downloading the program modules from the other computer system for execution on one or more different computer systems. The functionality of the program modules may be combined or split between program modules as desired in various embodiments. Computer-executable instructions for program modules may be executed within a local or distributed computing system. The computer-executable instructions, which may include data, instructions, and configuration parameters, may be provided via an article of manufacture including a computer readable medium, which provides content that represents instructions that can be executed. A computer readable medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

The terms "computer system" "system" and "computing device" are used interchangeably herein. Unless the context clearly indicates otherwise, neither term implies any limitation on a type of computing system or computing device. In general, a computing system or computing device can be local or distributed and can include any combination of special-purpose hardware and/or general-purpose hardware with software implementing the functionality described herein.

Figure 11:
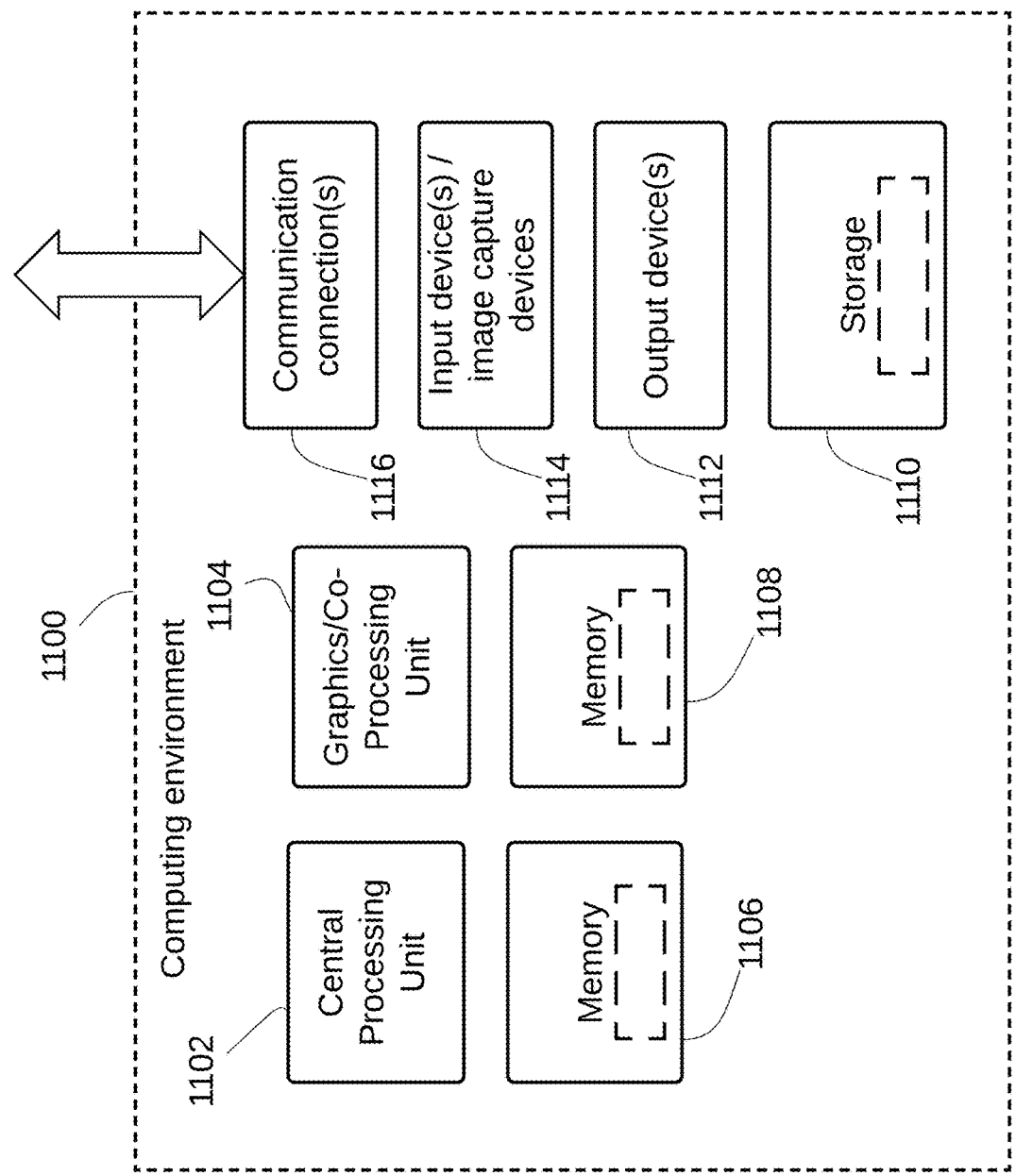
FIG. 11 illustrates a block diagram of hardware that may be employed in an implementation of the system 11.

FIG. 11 illustrates a block diagram of hardware that may be employed in an implementation of the RPA system as disclosed herein. FIG. 11 depicts a generalized example of a suitable general-purpose computing system 1100 in which the described innovations may be implemented in order to improve the processing speed and efficiency with which the computing system 1100 operates to perform the functions disclosed herein. With reference to FIG. 11 the computing system 1100 includes one or more processing units 1102, 1104 and memory 1106, 1108. The processing units 1102, 1106 execute computer-executable instructions. A processing unit can be a general-purpose central processing unit (CPU), processor in an application-specific integrated circuit (ASIC) or any other type of processor. The tangible memory 1106, 1108 may be volatile memory (e.g., registers, cache, RAM), non-volatile memory (e.g., ROM, EEPROM, flash memory, etc.), or some combination of the two, accessible by the processing unit(s). The hardware components in FIG. 11 may be standard hardware components, or alternatively, some embodiments may employ specialized hardware components to further increase the operating efficiency and speed with which the system 1100 operates. The various components of computing system 1100 may be rearranged in various embodiments, and some embodiments may not require nor include all of the above components, while other embodiments may include additional components, such as specialized processors and additional memory.

Computing system 1100 may have additional features such as for example, storage 1110, one or more input devices 1114, one or more output devices 1112, and one or more communication connections 1116. An interconnection mechanism (not shown) such as a bus, controller, or network interconnects the components of the computing system 1100. Typically, operating system software (not shown) provides an operating system for other software executing in the computing system 1100, and coordinates activities of the components of the computing system 1100.

The tangible storage 1110 may be removable or non-removable, and includes magnetic disks, magnetic tapes or cassettes, CD-ROMs, DVDs, or any other medium which can be used to store information in a non-transitory way, and which can be accessed within the computing system 1100. The storage 1110 stores instructions for the software implementing one or more innovations described herein.

The input device(s) 1114 may be a touch input device such as a keyboard, mouse, pen, or trackball, a voice input device, a scanning device, or another device that provides input to the computing system 1100. For video encoding, the input device(s) 1114 may be a camera, video card, TV tuner card, or similar device that accepts video input in analog or digital form, or a CD-ROM or CD-RW that reads video samples into the computing system 1100. The output device(s) 1112 may be a display, printer, speaker, CD-writer, or another device that provides output from the computing system 1100.

The communication connection(s) 1116 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

It should be understood that functions/operations shown in this disclosure are provided for purposes of explanation of operations of certain embodiments. The implementation of the functions/operations performed by any particular module may be distributed across one or more systems and computer programs and are not necessarily contained within a particular computer program and/or computer system.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

What is claimed is:

1. A method of computerized process automation, comprising:
   recording inputs of a computing device user to generate a log of inputs by the user in connection with one or more applications with which the user interacts to perform one or more tasks, wherein the log includes the inputs of the user and information pertaining to the one or more applications;
   processing the log to identify the one or more applications and to identify fields in the identified one or more applications;
   generating a user action file and storing at least the identified one or more fields to the user action file;
   processing the user action file to identify one or more actions performed by the user with respect to the identified one or more applications; and
   generating a new software robot which is encoded with instructions to automatically perform, when invoked, the identified one or more actions performed by the user with respect to the identified one or more applications.

2. The computerized method of claim 1 further comprising:
   accessing a first list of rules that specify fields in the one or more applications that may be recorded; and
   recording inputs to at least one of the one or more applications by a computing device user only for the fields specified in the first list of rules.

3. The computerized method of claim 1 further comprising:
   accessing a second list of rules that specify fields in the one or more applications that may not be recorded; and
   not recording inputs to the one or more applications by a computing device user for the fields specified in the second list of rules.

4. The computerized method of claim 1 further comprising:
   recording inputs to the one or more applications by multiple computing device users to generate the log, the log including inputs of the users in connection with the one or more applications.

5. The computerized method of claim 1, wherein the recording inputs to the one or more applications by the computing device user to generate a log of inputs comprises capturing an image of each screen of a plurality of screens displayed to the computing device user in connection with the one or more applications, and wherein the computerized method comprises:

generating a unique fingerprint identifier for each screen of information to uniquely identify each screen of information;

searching, with the unique fingerprint identifier, a database of stored fingerprint identifiers to identify a matching fingerprint identifier, wherein each of the stored fingerprint identifiers is associated in the database with a set of known actions in the application associated with the corresponding screen; and retrieving the set of known actions in the application associated with the screen when the searching identifies the matching fingerprint identifier.

6. The computerized method of claim 1, wherein the processing the user action file to identify one or more actions performed by the user comprises:

converting each of the identified one or more actions to a known user action with respect to the identified one or more applications.

7. The computerized method of claim 1, wherein the generating a new software robot which is encoded with instructions to perform automatically, when invoked, the actions performed by the user with respect to the identified one or more applications comprises:

creating an execution file by inserting the actions performed by the user with respect to the identified one or more applications, wherein each of the actions performed by the user with respect to the identified one or more applications comprises an automated action in the execution file; and replacing certain known quantities in the execution file with variables to permit the execution file to be executed with the identity and authentication credentials of other users.

8. A robotic process automation system comprising:

data storage having stored thereupon, a plurality of software robots, each of which when deployed performs a sequence of actions with respect to one or more computer applications on a designated computer system having access to an identity and credentials of a designated human user;

a plurality of work items for processing by one or more of the plurality of software robots; and a processor which programmed with instructions to execute operations, comprising:

recording inputs of a computing device user to generate a log of inputs by the user in connection with one or more applications with which the user interacts to perform one or more tasks, wherein the log includes the inputs of the user and information pertaining to the one or more applications;

processing the log to identify the one or more applications, and identify fields in the identified one or more applications; and generating a user action file and storing at least the identified one or more fields to the user action file;

processing the user action file to identify one or more actions performed by the user with respect to the identified one or more applications; and generating a new software robot which is encoded with instructions to automatically perform, when invoked, the identified one or more actions performed by the user with respect to the identified one or more applications.

9. The robotic process automation system of claim 8 wherein the processor is further programmed with instructions to execute operations comprising:

accessing a first list of rules that specify fields in the one or more applications that may be recorded; and recording, to the log, inputs to at least one of the one or more applications by a computing device user only for the fields specified in the first list of rules.

10. The robotic process automation system of claim 8 wherein the processor is further programmed with instructions to execute operations comprising:

accessing a second list of rules that specify fields in the one or more applications that may not be recorded; and not recording, to the log, inputs to the one or more applications by a computing device user for the fields specified in the second list of rules.

11. The robotic process automation system of claim 8 wherein the processor is further programmed with instructions to execute operations comprising:

recording inputs to the one or more applications by multiple computing device users to generate the log, the log including inputs of the users in connection with the one or more applications.

12. The robotic process automation system of claim 8 wherein recording inputs of a computing device user to generate a log of inputs by the user in connection with one or more applications comprises capturing an image of each screen of a plurality of screens displayed to the user in connection with the one or more applications, and wherein the method further comprising:

generating a unique fingerprint identifier for each screen of information to uniquely identify each screen of information;

searching, with the unique fingerprint identifier, a database of stored fingerprint identifiers to identify a matching fingerprint identifier, wherein each of the stored fingerprint identifiers is associated in the database with a set of known actions in the application associated with the corresponding screen; and retrieving the set of known actions in the application associated with the screen when the searching identifies the matching fingerprint identifier.

13. The robotic process automation system of claim 8 wherein processing the user action file to identify one or more actions performed by the user comprises:

converting each of the identified one or more actions to a known user action with respect to the identified one or more applications.

14. The robotic process automation system of claim 8 wherein comparing the one or more actions performed by the user with respect to the identified applications to actions performed by a set of software robots and if a match is identified then notifying a user of the match comprises:

generating, for a set of software robots, a bot action file for each software robot in the set of software robots;

training a deep neural network with each bot action file and each software robot to generated a trained model; and providing the one or more actions performed by the user with respect to the identified applications to the trained model to identify a match between actions performed by the user with respect to the identified applications and actions performed by the set of software robots.

15. The robotic process automation system of claim 8 wherein generating a new software robot which is encoded with instructions to perform automatically, when invoked, the actions performed by the user with respect to the identified applications comprises:
creating an execution file by inserting the actions performed by the user with respect to the identified one or more applications, wherein each of the actions performed by the user with respect to the identified one or more applications comprises an automated action in the execution file; and
replacing certain known quantities in the execution file with variables to permit the execution file to be executed with the identity and authentication credentials of other users.

16. A method of computerized process automation, comprising:
recording inputs of a computing device user to generate a log of inputs by the user in connection with one or more applications with which the user interacts to perform one or more tasks;
processing the log to identify the one or more applications, and to identify fields in the identified one or more applications;
generating a user action file and storing at least the identified one or more fields and/or the identified one or more applications to the user action file;
processing the user action file to identify one or more actions performed by the user with respect to the identified one or more applications;
comparing the one or more actions performed by the user with respect to the identified one or more applications to actions performed by a set of software robots to identify at least one matching software robot within the set of software robots; and
notifying a user of the at least one matching software robot.

17. The method of claim 16 further comprising:
generating a new software robot which is encoded with instructions to perform automatically, when invoked, the actions performed by the user with respect to the identified one or more applications.

18. The method of claim 16 further comprising:
accessing a first list of rules that specify fields in the one or more applications that may be recorded; and
recording, to the log, inputs to at least one of the one or more application by the user only for the fields specified in the first list of rules.

19. The method of claim 18 further comprising:
accessing a second list of rules that specify fields in the one or more applications that may not be recorded; and
not recording, to the log, inputs to the one or more applications by a computing device user for the fields specified in the second list of rules.

20. The method of claim 16 further comprising:
recording inputs to the one or more applications by multiple computing device users to generate the log, the log including inputs of the users in connection with the one or more applications.

21. The method of claim 16 wherein the recording inputs to the one or more applications by the computing device user to generate a log of inputs comprises capturing an image of each screen of a plurality of screens displayed to the computing device user in connection with the one or more applications, and
wherein the computerized method further comprises:
generating a unique fingerprint identifier for each screen of information to uniquely identify each screen of information;
searching, with the unique fingerprint identifier, a database of stored fingerprint identifiers to identify a matching fingerprint identifier, wherein each of the stored fingerprint identifiers is associated in the database with a set of known actions in the application associated with the corresponding screen; and
retrieving the set of known actions in the application associated with the screen when the searching identifies the matching fingerprint identifier.

22. The method of claim 16 wherein the processing the user action file to identify one or more actions performed by the user comprises:
converting each of the identified one or more actions to a known user action with respect to the identified one or more applications.

23. The method of claim 16 wherein the comparing the one or more actions performed by the user with respect to the identified one or more applications to actions performed by a set of software robots, comprises:
generating, for a set of software robots, a bot action file for each software robot in the set of software robots;
training a deep neural network with each bot action file and each software robot to generated a trained model; and
providing the one or more actions performed by the user with respect to the identified one or more applications to the trained model to identify a match between actions performed by the user with respect to the identified one or more applications and actions performed by the set of software robots.

24. The method of claim 16 wherein the generating a new software robot which is encoded with instructions to perform automatically, when invoked, the actions performed by the user with respect to the identified one or more applications comprises:
creating an execution file by inserting the actions performed by the user with respect to the identified one or more applications, wherein each of the actions performed by the user with respect to the identified one or more applications comprises an automated action in the execution file; and
replacing certain known quantities in the execution file to variables to permit the execution file to be executed with the identity and authentication credentials of other users.

25. A non-transitory tangible computer readable medium including at least computer program code for computerized process automation, the computer readable medium comprising:
computer program code for recording inputs of a computing device user to generate a log of inputs by the user in connection with one or more applications with which the user interacts to perform one or more tasks, wherein the log includes the inputs of the user and information pertaining to the one or more applications;
computer program code for generating a user action file by at least processing the log to identify the one or more applications, and to identify fields in the identified one or more applications with which the user entered inputs, and storing at least the identified one or more fields and/or the identified one or more applications to the user action file;
computer program code for processing the user action file to identify one or more actions performed by the user with respect to the identified one or more applications; and computer program code for generating a new software robot which is encoded with instructions to automatically perform, when invoked, the identified one or more actions performed by the user with respect to the identified one or more applications.

\* \* \* \* \*